Figure 1:
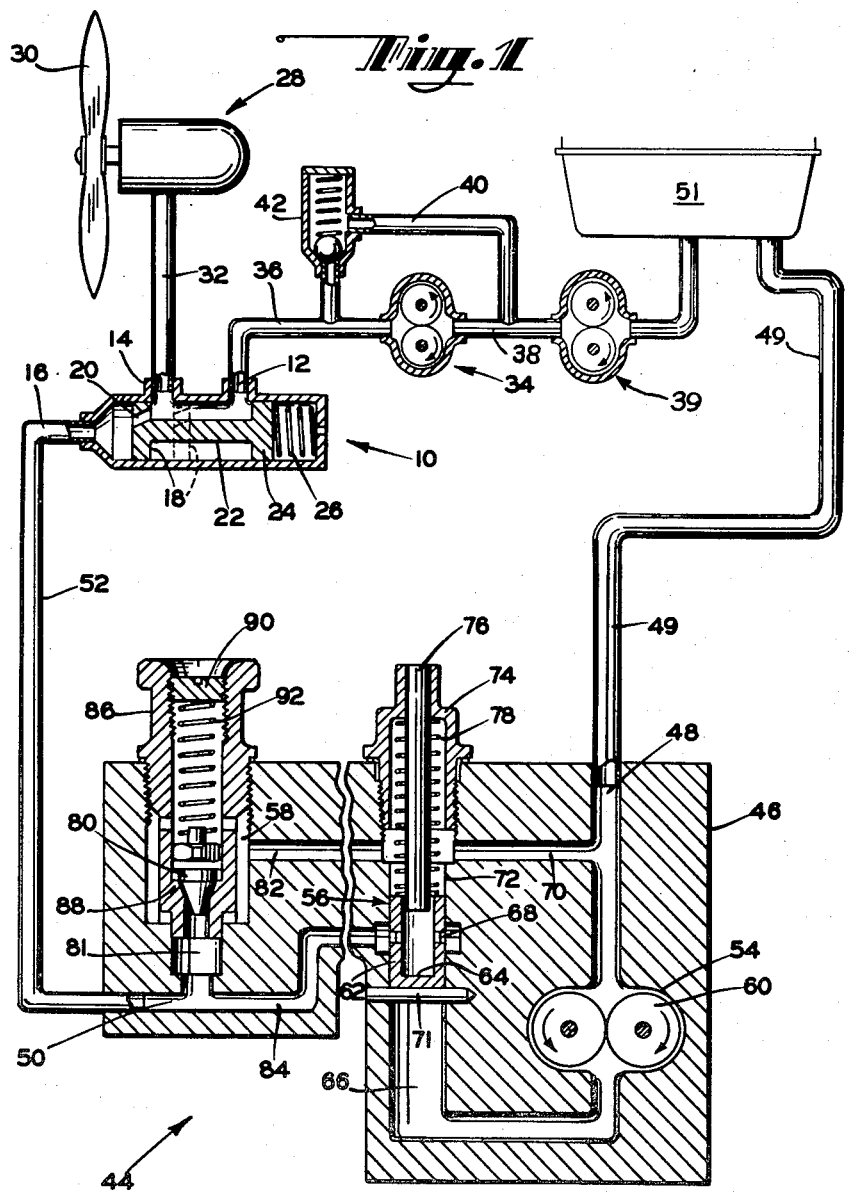

June 19, 1951 R. T. ZWACK 2,557,334
FLUID CONTROL SYSTEM AND MEANS
Filed March 10, 1947 2 Sheets-Sheet 1

INVENTOR.
RAYMOND T. ZWACK
BY
Frederic H. Miller
ATTORNEY

June 19, 1951 R. T. ZWACK 2,557,334
FLUID CONTROL SYSTEM AND MEANS
Filed March 10, 1947 2 Sheets-Sheet 2

INVENTOR.
RAYMOND T. ZWACK
BY
Frederic H. Miller
ATTORNEY

Patented June 19, 1951

2,557,334

UNITED STATES PATENT OFFICE 2,557,334

FLUID CONTROL SYSTEM AND MEANS

Raymond T. Zwack, West Caldwell, N. J., assignor to Bendix Aviation Corporation, Teterboro, N. J., a corporation of Delaware Application March 10, 1947, Serial No. 733,649

14 Claims. (Cl. 170—160.23)

The present invention relates to fluid control systems and means, and is an improvement of the apparatus of my copending application, Serial No. 684,461, on Fluid Control Means, filed July 18, 1946, for maintaining predetermined flow conditions between remote stations, as between propeller pitch control regulating means and feathering pump means, irrespective of effects, such as temperature differences at the stations.

In the example mentioned, the pitch of aircraft propeller blades is regulated automatically in accordance with the speed of the craft by servo means including a transfer valve, fluid responsive pitch adjusting means and a governor pump, which adjustment is translated back to the craft engine to maintain the engine speed substantially constant irrespective of craft speed and other variations.

Within certain limits, the means at the propeller station is normally sufficient to regulate the propeller pitch, but when feathering is desired, is insufficient either to effectively feather or unfeather the blades in proper time, because of low pressure and delivery of the governor pump.

A prior suggestion is to provide a high pressure feathering pump in a fluid circuit from the engine crank case, through the feathering pump and the transfer valve to the propeller servo means, with the transfer valve bleeding warm oil to the circuit to the feathering pump. This feature is to maintain the feathering pump and associated parts constantly in condition for effective operation, irrespective of low temperatures which might otherwise clog the circuit and prevent such operation.

Although not shown in the above-mentioned copending application, since it is not germane to the invention thereof, the system formerly included a relief valve adjacent to, or in the feathering pump housing also having a bleeder hole in a fluid circuit shunting the feathering pump between its inlet and outlet. Such feathering pump relief valve bleed, if not compensated for, as by the present invention, reduces the efficiency of the system and of the feathering pump to a high degree, represented by a loss to the active pressure circuit, at 150 degrees F., of approximately .58 gallon per minute, at 400 pounds per square inch, of .70 g. p. m. at 600 p. s. i., and of .85 g. p. m. at 800 p. s. i.

An object of the present invention therefore, is to avoid such loss and to do so by novel effective means.

Another object, in connection with a valve, which may be called a "warming valve," and which controls the flow of warming oil bleeding from the transfer valve through the feathering pump, is to so combine such valve with a feathering pump and a relief valve normally passing no fluid at all, as to stop all losses, such as those above set forth, and still provide excessive pressure relief when it is required.

Another object is to provide the combination aforenoted wherein the warming and relief valves may be separate entities for the same or a like purpose.

Another object is to provide the combination aforesaid wherein the function of the warming and relief valves may be effected by a unit valve structure.

Another object is to provide valve and pump structure, as aforesaid, which is simple and durable in construction, economical to manufacture and effective in its operation.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

Figure 2:
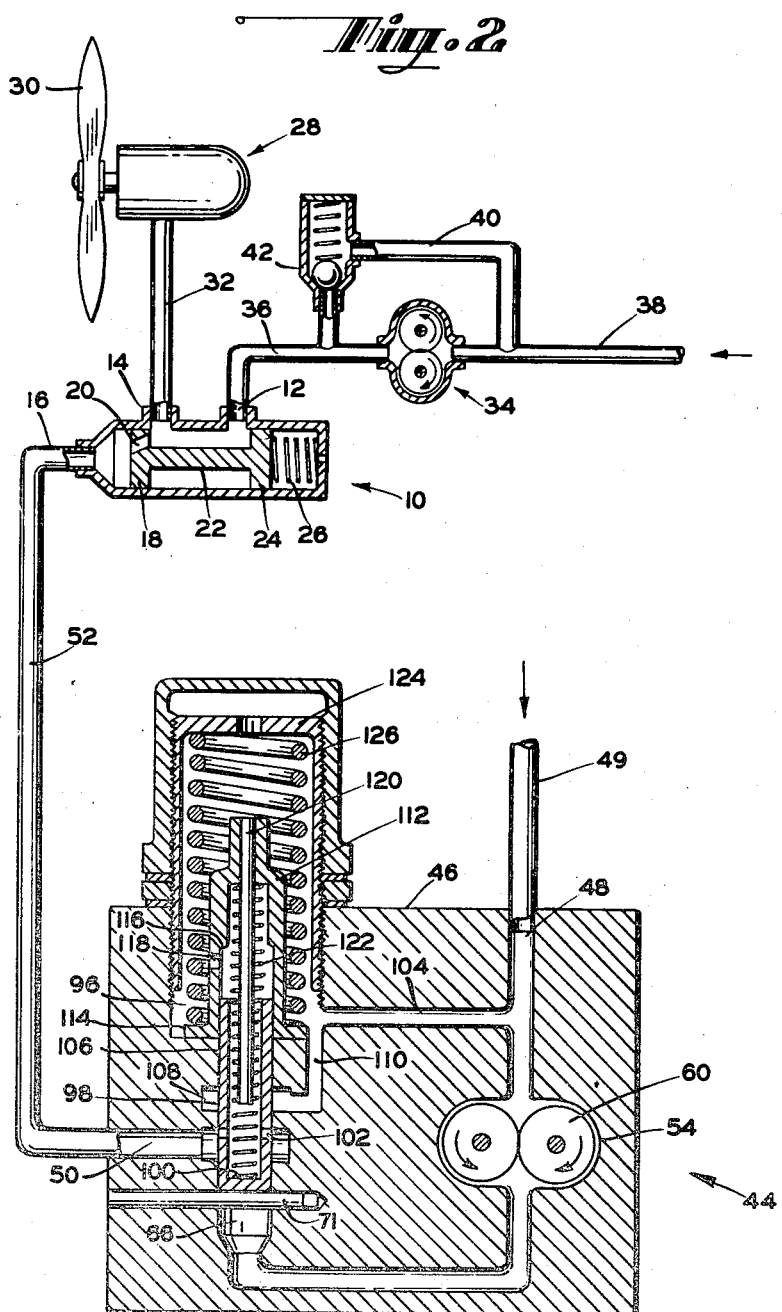

In the drawings:

Figure 1 is a diagram of a portion of a fluid system embodying the invention in one form, including pump means and valve means in section as actually constructed; and Figure 2 is a view similar to Figure 1 of the invention thereof in modified form.

Since aircraft propeller pitch control systems, of the type to which the present invention relates, are usual and known to those versed in the art, only so much of such system deemed necessary to a proper understanding of the present invention is indicated herein.

Referring to Figure 1, the portion of the system shown, comprises a transfer valve 10 having an inlet 12, a normal outlet 14 and a bleeder outlet 16. A movable valve member 18, having a bleeder hole 20, is connected, as by a rod 22 to a piston 24, and is normally biased, as by a spring 26, to position, shown in full lines, fully opening the normal outlet 14 and bleeding through the hole 20 to the bleeder outlet 16. The member 18 is movable against the bias of the spring 26 to position, indicated in broken lines, providing full communication between the outlets 14 and 16. Fluid-responsive means 28, for regulating the pitch of propeller blades 30, communicates through conduit means 32 with the normal outlet 14.

A governor pump 34, normally operated by the engine, has an outlet 36 to the transfer valve inlet 12 and an inlet 38 adapted to receive fluid from a source, such as the outlet side of the craft engine pump 39, and is provided with by-pass means 40 including a relief valve 42 between the governor pump outlet 36 and inlet 38.

In combination with the above-described prior parts, according to the present invention, is a feathering pump 44 including a housing 46 having an inlet 48 adapted, in this instance, to receive fluid through a conduit 49 from substantially the same source as the inlet 38, such as the crank case 51 of the engine, and an outlet 50 adapted, as by a conduit 52, for communication with the bleeder outlet 16.

The housing 46 has a pump chamber 54 and forms, as shown in Figure 1, separate warming oil relief valve chamber means 56 and 58 respectively, in the pump chamber 54 of which one or more pump elements or gears 60 are disposed for operation, as by an electric motor, in a usual manner.

A valve thimble 62, in the warming valve chamber means 56, has a closed end 64 normally closing an outlet 66 of the pump chamber 54, and having a side duct or ducts 68 normally open to the bleeder outlet 16, and by-passing fluid therefrom through the thimble 62 and a port 70 in the housing 46 to the inlet 48 of the feathering pump chamber 54. Means, acting as a stop for the thimble 62 in its closed or lower position shown, may comprise a pin 71, of small diameter compared to the diameter of the outlet 66, extending across the outlet.

The housing 46 has a land 72 between its outlet 66 and its port 70.

A cup 74, closing the valve chamber means 56, carries a rod 76 extending into the open end of the thimble 62, which rod is adapted to limit movement of the thimble by engagement with the closed end 64, against the action of a light compression spring 78 around the rod 76 between the cap 74 and the thimble 62.

The thimble 62 is movable against the action of the spring 78 in response to fluid pressure caused by operation of the feathering pump gears 60, for engaging the closed end 64 to the rod 76 to open the pump chamber outlet 66 and to close the ducts 68 by the land 72.

A second relief valve member 80, in the relief valve chamber means 58 normally fully closes passages 81 and 82 which are disposed in shunt circuit relation to the pump and the warming valve between the outlet or downstream side 84 of the thimble 62 and the inlet side 48 of the feathering pump chamber 54. A cap or housing 86, for the relief valve chamber 58, has a seat 88 for the valve member 80, and supports a screw 90, which is soldered in position, after adjustment thereby of the compression of a heavy spring 92, between the screw 90 and the valve member 80.

In operation, with the parts in the positions indicated, the system is set up as it is during normal pitch control, when the feathering pump 44 is inactive.

During this condition, with the governor pump 34 operating at all times during engine operation and rotation of the propeller blades 30 to draw fluid through the conduit 38, the valve member 18 of the transfer valve 10 is to the left of the conduit means 32, as indicated in full lines, whereby pressure of the fluid being pumped by the governor pump 34 is transmitted through its outlet 36, the inlet 12, the transfer valve 10 and the conduit means 32 to the servo actuator means 28, with a small flow of warm oil bleeding through the hole 20 to the outlet 16. The fluid flows from the outlet 16 through the conduit 52, the outlet 50, the ducts 68, the thimble 62 and the port 70 to the inlet 48, and back to the oil source through the conduit 49, and since all of the pump and valve parts are in good heat exchange relation to each other, these parts and the conduit 52 are constantly maintained in condition for effective operation irrespective of low temperatures, and the distance, within limits, of the feathering pump 44 from the means 28 and associated parts adjacent to the station thereof. The diameters of the bleed passages may be varied in accordance with the requirements of individual applications.

When the feathering pump 44 is operated, its fluid pressure, against the closed end 64 of the thimble 62, substantially instantly moves the thimble against the action of the light spring 78 to a position in which the end 64 engages the rod 76. In this position, the ducts 68 are closed by the land 72, and the outlet 66 is open to the downstream side 84 of the thimble 62 to the outlet 50 and the conduit 52. The pressure against the transfer valve member 18 thus effected, moves the latter, against the bias of the spring 26 and the smaller pressure of the governor pump 34 to the right of the conduit means 32, as indicated by the broken line position of the members 18. In the latter position, with the fluid pressure of the governor pump 34 blocked at the orifice 20, the relief valve 42 opens to relieve the governor pump. Means, other than the transfer valve mechanism shown, may, of course be employed to accomplish a comparable purpose.

In the above-described structure, the feature whereby the warming and relief valve chamber means 56 and 58 are separately formed in the housing 46 and connected by the passages 81 and 82, provides an advantage in design of the pump wherein the chambers 56 and 58 may be severally located as desired, although the structure of Figure 2, to be described, in which a single chamber is the equivalent of the chambers 56 and 58 is employed, also has advantages of design, assembly and compactness.

In a former structure, the warming oil bleed flow through the feathering pump 44, instead of passing through the ducts 68 and the port 70, passed through a hole in a member corresponding to the valve member 80, so that when the feathering pump operated, such by-pass flow lowered the efficiency of the pump by amounts according to the oil loss per minute at different pressures above set forth.

In Figure 2, in which corresponding parts are designated by corresponding reference numerals, the construction and operation are similar to those above described, with the exception, as aforenoted of the forming of the chambers 56 and 58 as a single chamber 96 in the housing 46 and other features resulting from such change.

The housing 46 of the feathering pump 44 has an inlet 48 adapted to receive fluid from the conduit 49 and an outlet 50 adapted for communication through the conduit 52 from the bleeder outlet 16, and forms the pump chamber 54 for the gears 60, and the single valve chamber 96.

A valve thimble member 98 in the chamber 96 has a closed end 100 normally closing the feathering pump chamber outlet 66, and is provided with a side duct or ducts 102 normally open to the bleeder outlet 16 and by-passing fluid therefrom through the thimble and a port 104 in the housing to the pump chamber inlet 48. The stop pin 71, for the thimble 98, extends across the outlet 66.

A land 106 is disposed between the outlet 66 and the port 104, and a relief pressure chamber 108, between the outlet 50 and the land 106 communicates through a passage 110 with the port 104.

A closed end tubular cap 112, given by way of example, has an open end outer radial flange 114, an intermediate inner annular shoulder 116, and a side aperture 118, between the flange 114 and the shoulder 116, communicating with the port 104. The cup 112 carries a rod 120 extending from the closed end of the cap into the open end of the thimble 98.

A second cap 124, over the first cap 112, encloses a heavier spring 126 around the first cap, and compresses the spring 126 between the closed end of the cap 124 and the flange 114.

In operating the system of Figure 2, with the parts positioned as indicated, the fluid flows from the outlet 16 through the conduit 52, the outlet 50, the ducts 102, the thimble 98, the aperture 118 in the cap 112 and the port 104 to the inlet 48, and back to the oil source through the conduit 49.

When the feathering pump 44 is operated, the fluid pressure thereof, against the closed end 100 of the thimble 98, substantially instantly moves the thimble against the action of a light spring 122 to a position in which the thimble 98 engages the shoulder 116, in which position also, the ducts 102 are within the land 106 such that no bleed oil can flow, and the oil normally lost in former systems being utilized to add to the efficiency of the feathering pump 44.

When the pressure reaches the relieving value, the thimble 98 engages the shoulder 116 and pushes the cap 112 against the bias of the heavy spring 126 until the end 100 is above the bottom of the relief chamber 108 for relief of the excess pressure through the passage 110 and the port 104.

Although only two embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a fluid system comprising a transfer valve having an inlet, a normal outlet and a bleeder outlet, a movable valve member having a bleeder hole and normally biased to position fully opening said normal outlet and bleeding to said bleeder outlet, said member being movable against said bias to position providing full communication between said normal outlet, fluid-responsive propeller pitch regulating means communicating with said normal outlet, a normally operating governor pump having an inlet and an outlet to the transfer valve inlet, and by-pass means including a relief valve between the governor pump inlet and outlet, the combination of a feathering pump including a housing having an inlet and an outlet, the latter adapted for communication with said bleeder outlet, said housing having a pump chamber and forming valve chamber means, pump gears in said pump chamber, a valve thimble in said chamber means having a closed end normally closing the feathering pump chamber outlet and having side ducts normally open to said bleeder outlet and by-passing fluid therefrom through the thimble and a port in said housing to the feathering pump chamber inlet, said housing having a land between its said outlet and said port, a cap mounted on the housing supporting a rod extending into the open end of said thimble and adapted to limit movement of the thimble by engagement with said closed end, a compression spring around said rod between said cap and said thimble, said thimble being movable against the action of said spring in response to fluid pressure caused by operation of the feathering pump to open siad pump chamber outlet and to close said ducts by said land, a second relief valve member in said valve chamber means normally fully closing a passage in shunt between the outlet side of said feathering pump at the outlet side of said thimble and the inlet side of the feathering pump, a cap for said second relief valve, and a compression spring between said relief valve cap and said second relief valve member.

2. In a fluid system comprising a transfer valve having an inlet, a normal outlet and a bleeder outlet, a movable valve member having a bleeder hole and normally biased to position fully opening said normal outlet and bleeding to said bleeder outlet, said member being movable against said bias to position providing full communication between said outlets, fluid-responsive propeller pitch regulating means communicating with said normal outlet, a normally operating governor pump having an inlet and an outlet to the transfer valve inlet, and by-pass means including a relief valve between the pump inlet and outlet, the combination of a feathering pump including a housing having an inlet and an outlet, the latter adapted for communication with said bleeder outlet, said housing having a pump chamber and forming relief and warming fluid valve chambers, pump gears in said pump chamber, a valve thimble in said warming chamber having a closed end normally closing the feathering pump chamber outlet and having side ducts normally open to said bleeder outlet and by-passing fluid therefrom through the thimble and a port in said housing to the feathering pump chamber inlet, a stop pin for said closed thimble end extending across said feathering pump chamber outlet, said housing having a land between its said outlet and said port, a cap closing the warming valve chamber supporting a rod extending into the open end of said thimble and adapted to limit movement of the thimble by engagement with said closed end, a compression spring around said rod between said cap and said thimble, the latter being movably responsive to fluid pressure caused by operation of the feathering pump against the action of said spring for engaging said closed end to said rod to open said feathering pump chamber outlet and to close said ducts by said land, a second relief valve member in said relief valve chamber normally fully closing a passage in shunt between the feathering pump outlet side of said thimble and the feathering pump inlet, a cap for said second relief valve, and a compression spring between said relief valve cap and said second relief valve member.

3. In a fluid system comprising a transfer valve having an inlet, a normal outlet and a bleeder outlet, a movable valve member having a bleeder hole and normally biased to position fully opening said normal outlet and bleeding to said bleeder outlet, said member being movable against said bias to position providing full communication between said outlets, fluid-responsive propeller pitch regulating means communicating with said normal outlet, a normally operating governor pump having an inlet and an outlet to the transfer valve inlet, and by-pass means including a relief valve between the pump inlet and outlet, the combination of a feathering pump including a housing having an inlet and an outlet, the latter adapted for communication with said bleeder outlet, said housing forming a pump chamber and a valve chamber, pump gears in said pump chamber, a valve thimble in said valve chamber having a closed end normally closing the feathering pump chamber outlet and having side ducts normally open to said bleeder outlet and by-passing fluid therefrom through the thimble and a port in said housing to the feathering pump chamber inlet, a stop pin for said closed thimble end extending across said feathering pump outlet, said housing having a land between its said pump chamber outlet and said port and a relief pressure chamber between its said outlet and said land communicating with said port, a closed end tubular cap in said valve chamber having an open end radially outer flange, an intermediate inner shoulder, and a side aperture between the flange and the shoulder communicating with said port, said cap carrying a rod extending from the closed end of the cap into the open end of said thimble and adapted to limit movement of the thimble by engagement with the closed thimble end, a light compression spring around said rod between said cap and said thimble, the latter being movably responsive to fluid pressure caused by operation of the feathering pump against the action of said spring to open said feathering pump chamber outlet and to close said ducts by said land, a second cap over said first cap, and a heavier spring in said second cap around said first cap compressed between the closed end of the second cap and said first cap flange, said thimble being responsive to excessive fluid pressure for movement placing the open end of the thimble against said second cap shoulder closing said aperture and the closed end of the thimble in position opening said relief pressure chamber between the feathering pump inlet and outlet.

4. For use with a pump having a housing forming a pump chamber provided with an inlet and an outlet and including pump means in said pump chamber; the combination comprising a valve chamber means in the pump housing, a valve thimble in said valve chamber means having a closed end adapted to close said outlet and forming a side duct providing for communication with said outlet at the downstream side of said closed end and adapted to by-pass fluid flow into said outlet at said side through the thimble and a port in the housing to the pump chamber inlet, a land in said housing between its said pump chamber outlet and said port, a cap closing the valve chamber means carrying a rod extending into the open end of said thimble and adapted to limit movement of the thimble by engagement with said closed end, a compression spring around said rod between said cap and said thimble, said thimble being normally responsive against the action of said spring to fluid pressure caused by operation of said pump means to open said pump chamber outlet and to close said duct by said land, a relief valve member in said valve chamber means normally fully closing a passage in shunt between said pump chamber outlet at said side and the pump chamber inlet, a cap for said relief valve, and a compression spring between the relief valve cap and said relief valve member.

5. For use with a pump having a housing forming a pump chamber provided with an inlet and an outlet and including pump means in said pump chamber; the combination comprising a pair of valve chambers in the pump housing, a valve thimble in one of said valve chambers having a closed end adapted to close said outlet and forming a side duct providing for communication with said outlet at the downstream side of said closed end and adapted to by-pass fluid flow into said outlet at said side through the thimble and a port in the housing to the pump chamber inlet, a land in said housing between the pump chamber outlet and said port, a cap closing said one valve chamber carrying a rod extending into the thimble through its open end and adapted to limit movement of the thimble by engagement with said closed end, a compression spring around said rod between said cap and said thimble, said thimble being movably responsive against the action of said spring to fluid pressure caused by operation of said pump means for engaging said closed end to said rod to open said pump shoulder outlet and to close said duct by said land, a relief valve member in the other of said valve chambers normally fully closing a passage in shunt between said pump chamber outlet at said side and the pump chamber inlet, a cap for said relief valve chamber, and a compression spring between the relief valve cap and the relief valve member.

6. For use with a pump having a housing forming a pump chamber having an inlet and an outlet, and including pump means in said pump chamber; the combination comprising a valve chamber in said pump housing, a valve thimble in said valve chamber having a closed end normally closing the pump chamber outlet and having a side duct providing for communication with said outlet at the downstream side of said closed end and adapted to by-pass fluid flow into said outlet at said side through the thimble and a port in the housing to the pump chamber inlet, a land in said housing between its said outlet and said port and a relief pressure chamber between said outlet and said land communicating with said port, a closed-end tubular cap in said valve chamber having an intermediate inner shoulder and a side aperture between the shoulder and the open end of said thimble communicating with said port, said cap carrying a rod extending into said thimble adapted to limit movement of the thimble, a light compression spring around said rod between said cap and said thimble, the latter being movably responsive against the action of said spring by fluid pressure caused by operation of said pump means to open said pump chamber outlet and to close said duct by said land, a second cap over said first cap, and a heavier spring in said second cap compressed between said first and second caps, said thimble being responsive to excessive fluid pressure for movement against said shoulder closing said aperture and for movement with the second cap against the action of said heavier spring to open said relief chamber between said pump chamber inlet and outlet.

7. In a fluid system comprising fluid-responsive propeller pitch regulating means, a source of relatively warm fluid, a transfer valve adapted to normally direct said warm fluid for actuating said regulating means and having means through which some of the warm fluid normally bleeds, a governor pump adapted to normally supply the warm fluid to said transfer valve, and a feathering pump which during its inaction is normally in thermal association with a flow of the warm fluid from said bleeder means, the combination of valve means including a warming valve normally passing said flow and responsive to operation of the feathering pump to stop said flow and pass reverse flow propeller feathering fluid under pressure to said regulating means through said transfer valve, said valve means also including a normally entirely closed relief valve adapted for operation by fluid in and to relieve pressure through a circuit shunted across said warming valve.

8. In a fluid system comprising fluid-responsive propeller pitch regulating means, a source of relatively warm fluid, a transfer valve adapted to normally direct said warm fluid for actuating said regulating means and having means through which some of the warm fluid normally bleeds, a governor pump adapted to normally supply the warm fluid to said transfer valve, and a feathering pump which during its inaction is normally in thermal association with a flow of warm fluid from said bleeder means, the combination of valve means including a warming valve and a normally entirely closed relief valve constituting separate entities in the circuit of said flow, said warming valve normally passing said flow and responsive to operation of the feathering pump to stop said flow and pass reverse flow propeller feathering fluid under pressure to said regulating means through said transfer valve, said relief valve being adapted for operation by fluid in and to relieve pressure through a circuit shunted across said warming valve.

9. In a fluid system comprising fluid-responsive propeller pitch regulating means, a source of relatively warm fluid, a transfer valve adapted to normally direct said warm fluid for actuating said regulating means and having means through which some of the warm fluid normally bleeds, a governor pump adapted to normally supply the warm fluid to said transfer valve, and a feathering pump which during its inaction is normally in thermal association with a flow of the warm fluid from said bleeder means, the combination of valve means including a unit in the circuit of said flow including a warming valve and a normally entirely closed relief valve, said warming valve normally passing said flow and responsive to operation of the feathering pump to stop said flow and pass reverse flow propeller feathering fluid under pressure to said regulating means through said transfer valve, said relief valve being adapted for operation by fluid in and to relieve pressure through a circuit shunted across said warming valve.

10. A propeller feathering pump, comprising in combination a housing forming a pump chamber having a fluid inlet and outlet means, and pumping means in said chamber, means forming a passage in the housing between said fluid inlet and outlet means in shunt to the pump chamber, a source of warming fluid connected to said outlet means, a valve controlling said shunt passage and normally effective during inoperation of said pumping means to close said outlet means to said pumping means and open said shunt passage to permit a reverse flow of said warming fluid from said outlet to said inlet means through said shunt passage in heat exchange relation to said pumping means to maintain the pumping means in condition for effective operation during relatively low ambient temperature conditions, said valve responsive to fluid pressure from said pumping means upon operation thereof to close said shunt passage and open said fluid outlet means to said pumping means to permit a flow of fluid from said fluid inlet means through said pumping means and out said fluid outlet means.

11. The combination defined by claim 10 including a spring opposing movement of said valve in a direction to open said shunt passage during normal operation of said pumping means and effective to permit said valve to open said shunt passage to said outlet means in response to an outlet fluid pressure from said pumping means in excess of a predetermined maximum value.

12. For use as an auxiliary power supply in operating a remotely located fluid responsive means for feathering an aircraft propeller, the combination of a pump comprising a housing forming a pump chamber having inlet and outlet means, means forming a passage in the housing between the inlet and outlet means in shunt to the pump chamber, pumping means in said chamber for pumping fluid from said inlet means through said outlet means, a fluid conduit connecting said outlet means to said remotely located fluid responsive means, means including a source of warm fluid and means located adjacent said fluid responsive means and connecting to said conduit to supply said warm fluid to said conduit whereby the pump when inactive is maintained warm by a flow of said warming fluid from the means adjacent the fluid responsive means through the conduit to the pump and through the pump from its outlet means through said shunt passage to its inlet means, a warming valve normally effective during inaction of the pump to pass said flow and responsive to pump operation to stop said flow and to pass reverse flow to said fluid responsive means, and a normally entirely closed relief valve adapted for operation by fluid in and to relieve pressure through a circuit shunted across said warming valve.

13. For use as an auxiliary power supply in operating a remotely positioned element for feathering and aircraft propeller, the combination of a pump comprising a housing forming a pump chamber having inlet and outlet means, means forming a passage in housing between the inlet and outlet means in shunt to the pump chamber, pumping means in said chamber, conduit means connected to said outlet means for conducting a first flow of fluid from said pump to said remotely positioned element, means including a source of warm fluid, and means located adjacent said remotely positioned element and connecting to said conduit to supply said warm fluid to said conduit means, the pump when inactive being adapted to be maintained warm by a second flow of fluid from the means located adjacent said remotely positioned element and through said shunt passage, valve means normally effective during inaction of the pump to pass said second flow and during operation of the pump to permit said first flow to said remotely positioned element, and a normally entirely closed relief valve communicating with the circuit of said valve means.

14. For use as an auxiliary power supply in feathering an aircraft propeller; the combination of a pump comprising a housing forming a pump chamber having inlet and outlet means, pumping means in said chamber, a source of warming fluid connected to said outlet means, the pump when inactive being adapted to be maintained warm by a flow of warming fluid from its outlet to its inlet means, a control valve normally effective during inaction of the pump to permit said flow and responsive to pump operation to stop said flow and pass reverse flow from said inlet means through the pump and said outlet means, and a normally entirely closed relief valve disposed in a circuit shunted across said control valve.

RAYMOND T. ZWACK.

REFERENCES CITED

The following references are of record in the file of this patent:

UNITED STATES PATENTS

| Number | Name | Date |
|---|---|---|
| 1,282,680 | Dupuy | Oct. 22, 1918 |
| 1,691,744 | VanArsdel | Nov. 13, 1928 |
| 1,896,508 | Brown | Feb. 7, 1933 |
| 2,280,714 | Martin | Apr. 21, 1942 |
| 2,398,713 | Martin | Apr. 16, 1946 |
| 2,402,065 | Martin | June 11, 1946 |